US012804714B2

(12) United States Patent
Peng et al.

(10) Patent No.: US 12,804,714 B2
(45) Date of Patent: Nov. 17, 2026

(54) METHOD AND DEVICE FOR DETERMINING RESOURCE IN SHARED BAND

(71) Applicant: VIVO MOBILE COMMUNICATION CO., LTD., Dongguan (CN)

(72) Inventors: Shuyan Peng, Dongguan (CN); Zichao Ji, Dongguan (CN); Huan Wang, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 301 days.

(21) Appl. No.: 18/532,255

(22) Filed: Dec. 7, 2023

(65) Prior Publication Data

US 2024/0114554 A1 Apr. 4, 2024

Related U.S. Application Data

(63) Continuation of application No. PCT/CN2022/098141, filed on Jun. 10, 2022.

(30) Foreign Application Priority Data

Jun. 11, 2021 (CN) ......................... 202110654021.5

(51) Int. Cl.

| | |
|---|---|
| *H04W 74/0816* | (2024.01) |
| *H04L 1/1812* | (2023.01) |
| *H04W 28/26* | (2009.01) |
| *H04W 72/02* | (2009.01) |
| *H04W 72/25* | (2023.01) |

(52) U.S. Cl.

CPC ....... *H04W 74/0816* (2013.01); *H04L 1/1812* (2013.01); *H04W 28/26* (2013.01); *H04W 72/02* (2013.01); *H04W 72/25* (2023.01)

(58) Field of Classification Search

CPC . H04W 74/0816; H04W 28/26; H04W 72/02; H04W 72/25; H04W 24/08; H04W 92/18; H04W 74/0808; H04W 4/06; H04W 28/24; H04W 72/0446; H04W 72/0453; H04W 72/30; H04W 72/542; H04L 1/1812; H04B 17/328

See application file for complete search history.

(56) References Cited

U.S. PATENT DOCUMENTS

2020/0029340 A1 1/2020 He et al.
2021/0092783 A1* 3/2021 Sun .................. H04W 74/0875
(Continued)

FOREIGN PATENT DOCUMENTS

CN 111954181 A 11/2020
KR 20210047942 A 4/2021
(Continued)

OTHER PUBLICATIONS

Mediatek Inc., "On sidelink mode-2 resource allocation", 3GPP TSG RAN WG1 Meeting #99, Reno, US, Nov. 18-22, 2019, R1-1912106.
(Continued)

*Primary Examiner* — Chae S Lee
(74) *Attorney, Agent, or Firm* — The Webb Law Firm

(57) ABSTRACT

A method for determining a resource in a shared band includes performing, by a first terminal, SL sensing; and determining, based on the SL sensing, a resource or candidate resource N indicated or reserved by a second terminal.

16 Claims, 6 Drawing Sheets

(56) References Cited

U.S. PATENT DOCUMENTS

| | | | | |
|---|---|---|---|---|
| 2021/0136732 | A1 | 5/2021 | Fakoorian et al. | |
| 2022/0070918 | A1 | 3/2022 | Fan et al. | |
| 2022/0248384 | A1* | 8/2022 | Sun | H04W 72/02 |
| 2022/0264646 | A1 | 8/2022 | Wang | |
| 2022/0312379 | A1* | 9/2022 | Xue | H04W 28/0289 |

FOREIGN PATENT DOCUMENTS

| | | | |
|---|---|---|---|
| WO | 2020146634 | A1 | 7/2020 |
| WO | 2021081700 | A1 | 5/2021 |

OTHER PUBLICATIONS

ZTE et al., "Further enhancement for Sidelink", 3GPP TSG RAN Rel-18 workshop, Electronic Meeting, Jun. 28-Jul. 2, 2021, RWS-210470.

* cited by examiner

METHOD AND DEVICE FOR DETERMINING RESOURCE IN SHARED BAND

CROSS-REFERENCE TO RELATED APPLICATIONS

The application is a Bypass Continuation Application of International Patent Application No. PCT/CN2022/098141, filed Jun. 10, 2022, and claims priority to Chinese Patent Application No. 202110654021.5, filed Jun. 11, 2021, the disclosures of which are hereby incorporated by reference in their entireties.

BACKGROUND OF THE INVENTION

Field of the Invention

This application pertains to the field of communications technologies, and relates to a method and device for determining a resource in a shared band.

Description of Related Art

In a future communications system, a shared band such as an unlicensed band may be used to supplement a licensed band, to help an operator expand services.

A sidelink (SL) system includes a resource determining manner based on resource reservation. In this manner, resource sensing is required between terminals before a resource is selected from an SL resource pool. If a terminal detects that a resource is reserved by another terminal, the resource is excluded from selection.

SUMMARY OF THE INVENTION

Embodiments of this application provide a method and device for determining a resource in a shared band.

According to a first aspect, a method for determining a resource in a shared band is provided and includes: performing, by a first terminal, SL sensing; and determining, based on the SL sensing, a resource or candidate resource N indicated or reserved by a second terminal.

According to a second aspect, an apparatus for determining a resource in a shared band is provided and includes: a sensing module, configured to perform SL sensing; and a resource determining module, configured to determine, based on the SL sensing, a resource or candidate resource N indicated or reserved by a second terminal.

According to a third aspect, a terminal is provided. The terminal includes a processor, a memory, and a program or instructions stored in the memory and capable of running on the processor. When the program or instructions are executed by the processor, the method according to the first aspect is implemented.

According to a fourth aspect, a terminal is provided. The terminal includes a processor and a communications interface. The processor is configured to: perform SL sensing; and determine, based on the SL sensing, a resource or candidate resource N indicated or reserved by a second terminal.

According to a fifth aspect, a non-transitory readable storage medium is provided. The non-transitory readable storage medium stores a program or instructions. When the program or instructions are executed by a processor, the method according to the first aspect is implemented.

According to a sixth aspect, a chip is provided. The chip includes a processor and a communications interface. The communications interface is coupled to the processor. The processor is configured to run a program or instructions to implement the method according to the first aspect.

According to a seventh aspect, a computer program or program product is provided. The computer program or program product is stored in a non-transitory storage medium. The computer program or program product is executed by at least one processor to implement the method according to the first aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. In the following descriptions, a new radio (NR) system is described for an illustrative purpose, and NR terms are used in most of the following descriptions. However, these technologies may also be applied to other applications than an NR system application, for example, a 6th Generation (6G) communications system.

Figure 1:
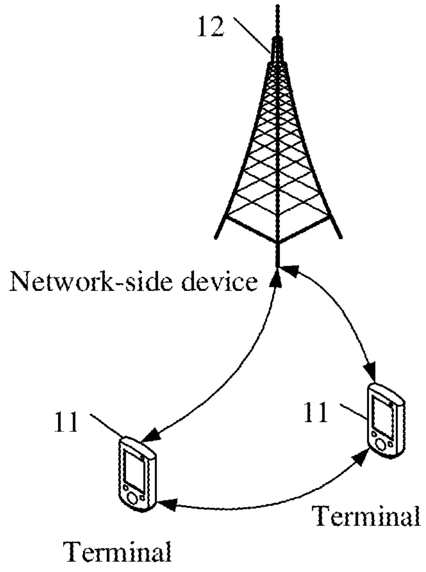
FIG. 1 is a schematic diagram of a wireless communications system according to an embodiment of this application.

FIG. 1 is a schematic diagram of a wireless communications system to which an embodiment of this application may be applied. The wireless communications system includes a terminal 11 and a network-side device 12. The terminal 11 may also be referred to as a terminal device or a user terminal (UE). The terminal 11 may be a terminal-side device such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device, vehicular user equipment (VUE), or pedestrian user equipment (PUE). The wearable device includes a smart watch, a smart band, an earphone, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a next generation NodeB (gNB), a home NodeB, a home evolved NodeB, a WLAN access point, a Wi-Fi node, a transmission and reception point (TRP), or another appropriate term in the art. As long as the same technical effect is achieved, the base station is not limited to specific technical terms. It should be noted that in the embodiments of this application, only a base station in an NR system is used as an example, but a specific type of the base station is not limited.

The related art does not provide a resource determining manner for SL transmission in the shared band. Therefore, it is difficult to ensure a channel access probability in the shared band.

A method and device for determining a resource in a shared band according to embodiments of this application are hereinafter described by using some embodiments and application scenarios thereof with reference to the accompanying drawings.

Figure 2:
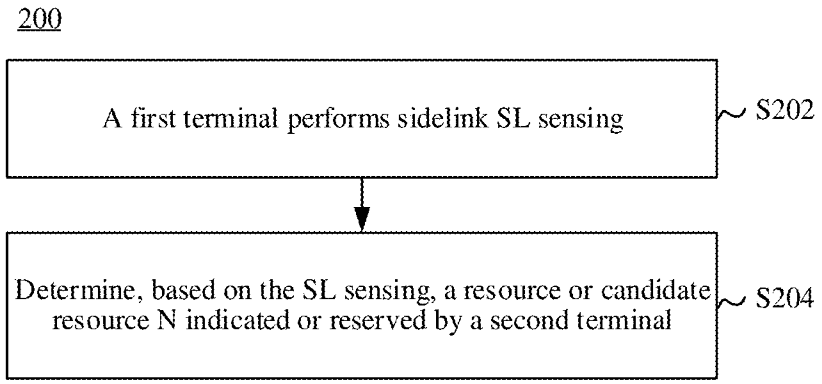
FIG. 2 is a schematic flowchart of a method for determining a resource in a shared band according to an embodiment of this application.

As shown in FIG. 2, an embodiment of this application provides a method 200 for determining a resource in a shared band. The method may be performed by a terminal. In other words, the method may be performed by software or hardware installed in the terminal. The method includes the following steps.

S202. A first terminal performs sidelink (SL) sensing.

Each embodiment of this application may be applied to a shared band. For example, the shared band includes an unlicensed band. Both the first terminal and a second terminal may be SL terminals performing SL transmission.

In this embodiment, the SL sensing performed by the first terminal may be the same as or different from a sensing method defined by NR in an intelligent traffic system (ITS) band or a licensed band, or may be the same as or different from a sensing method defined in R16/R17.

In a case that the foregoing sensing methods are the same, it means that the SL sensing method in this embodiment of this application may be compatible with other sensing methods. In a case that the foregoing sensing methods are different, it means that the SL sensing method in this embodiment of this application may be newly defined.

Optionally, the SL sensing in this embodiment of this application may include at least one of the following: detecting a physical sidelink control channel (PSCCH); detecting sidelink control information (SCI); detecting a physical sidelink feedback channel (PSFCH); detecting an acknowledgment (ACK) or a negative acknowledgment (NACK); detecting a wake-up signal (WUS); detecting a random access preamble sequence; detecting reference signal received power (RSRP); comparing RSRP with a threshold; clear channel assessment (CCA) or listen before talk (LBT) sensing; detecting a received signal strength indicator (RSSI); detecting energy; detecting a predefined, preconfigured, or configured sequence; or detecting a predefined, preconfigured, or configured position.

For example, before this embodiment, the first terminal may determine a relationship between a sequence and a position, where the relationship between the sequence and the position may be predefined, preconfigured, or configured in a protocol. If the first terminal detects a sequence, by default, a next slot is a resource or candidate resource N indicated or reserved by the second terminal.

Optionally, that the first terminal performs SL sensing includes: when the first terminal has to-be-sent data or to-be-received data, the first terminal performs the SL sensing.

Optionally, in this embodiment, that the first terminal performs SL sensing may include: the first terminal performs the SL sensing in a resource unit. For example, in a case that the first terminal performs continuous data reception, the first terminal always performs SL sensing at a slot boundary.

Optionally, a position of the SL sensing is determined based on at least one of the following:

(1) A time-frequency domain resource of a PSCCH configured in an SL resource pool. In other words, the first terminal can determine the position of the SL sensing based on the time-frequency domain resource of the PSCCH configured in the SL resource pool.

(2) A predefined, preconfigured, or configured time domain resource position and/or frequency domain resource position. In this embodiment, the position of the SL sensing in the shared band (for example, in the unlicensed band) may be additionally defined.

Optionally, when the SL sensing is detecting the SCI, to preempt resources with other systems, the SL terminals (such as the first terminal and the second terminal) may send SCI more intensively.

(3) A redefined, preconfigured, or configured resource position, where the resource may include a time domain resource and/or frequency domain resource.

S204. Determine, based on the SL sensing, the resource or candidate resource N indicated or reserved by the second terminal.

It should be noted that, in the resource or candidate resource N mentioned in this embodiment, "N" is only for ease of distinguishing from other resources, and does not represent a specific meaning. In subsequent embodiments, the resource or candidate resource N is referred to as resource N for short.

In this embodiment, the second terminal may be one SL terminal, or may be a plurality of SL terminals.

In this embodiment, the resource or candidate resource N indicated or reserved by the second terminal may include one of the following: the resource N indicated by the second terminal, the resource N reserved by the second terminal, the candidate resource N indicated by the second terminal, and the candidate resource N reserved by the second terminal. The candidate resource indicates a transmittable position, but may not be capable of transmission, and may further need to meet other conditions, for example, meet a condition that an LBT monitoring channel is empty.

In this embodiment, the resource or candidate resource N may be a resource of one second terminal, or may be a union of resources of a plurality of second terminals. All "resources" mentioned in the subsequent embodiments may include resources or resource unions.

In this embodiment, the resource or candidate resource N may be one resource or a plurality of resources. For example, the resource or candidate resource N is slot 1. For another example, the resource or candidate resource N is slot 1, slot 3, and slot 5.

Optionally, after the first terminal determines, based on the SL sensing, the resource or candidate resource N indicated or reserved by the second terminal, the first terminal may further perform resource selection based on the resource or candidate resource N, where a selected resource may be used by the first terminal for data transmission. For example, the first terminal selects a resource from the resource or candidate resource N, where the selected resource is used for data reception. For another example, the first terminal excludes the resource or candidate resource N, and selects a resource other than the resource or candidate resource N, where the selected resource is used for data sending or data reception.

In the method for determining a resource in a shared band according to this embodiment of this application, the first terminal determines, based on the SL sensing, the resource or candidate resource N indicated or reserved by the second terminal. In this way, the first terminal can further perform resource selection based on the resource or candidate resource N or the like. This helps increase a channel access probability in the shared band. In addition, the first terminal or the like can implement OFDMA to improve utilization of system resources.

In implementation of the method 200, SL terminals (including the first terminal, the second terminal, and the like) may reserve resources in a continuous resource reservation (or allocation) manner; or may reserve resources in a discontinuous resource reservation manner. The following describes the two solutions separately.

Solution 1:

In this solution, the SL terminal may reserve resources in the continuous resource reservation manner.

Optionally, each of the following methods in the solution 1 may be implemented in a case that the method meets at least one of the following that:

(1) the SL terminal uses continuous resource selection in time domain;

(2) a hybrid automatic repeat request (HARQ) feedback mechanism is disabled for an SL system;

(3) an SL uses blind retransmission;

(4) an SL channel busy rate (CBR) or channel occupancy rate (CR) is greater than or equal to a preset value; or (5) a size of a data packet meets a first preset condition, for example, a size of a data packet of the to-be-sent data is greater than a first value.

In other words, in a case that the SL terminal reserves continuous resources, it is considered meaningful to perform resource selection or resource extension based on resource positions reserved by other SL terminals (that is, a position of the resource or candidate resource N).

In the solution 1, the first terminal may always (always) perform SL sensing at a slot boundary, and if there is to-be-sent data, the first terminal may perform CCA or LBT sensing to contend with other systems for resources.

In the solution 1, in a case that the first terminal has to-be-sent data, the method may further include at least one of the following steps 1 to 6 after S204.

1. The first terminal performs CCA or LBT sensing on a first resource.

In this example, because the first terminal needs to send data, a resource may be selected through CCA or LBT sensing.

The first resource mentioned in this example includes at least one of the following (a) to (d): (a) a resource not including the resource or candidate resource N; (b) a remaining resource after the resource or candidate resource N is excluded; (c) candidate resources, where in one case, the candidate resources are resources in all resource units (such as slots) in the unlicensed band or shared band; or in another case, the candidate resources are resources in all resource units, excluding the resource or candidate resource N; or (d) a part of candidate resources, which may be a part of resources in the foregoing (c).

In the foregoing (a) and (b), if the resource or candidate resource N is a candidate resource indicated or reserved by the second terminal by using SCI, the first terminal considers the resource or candidate resource N as a resource occupied by another SL terminal (that is, the second terminal), or a resource originally intended to be reserved by another terminal but preempted by a device in another system. Therefore, the first terminal does not occupy the resource or candidate resource N.

2. The first terminal selects a resource in a resource unit in which the resource or candidate resource N is located. The resource or candidate resource N may be a set of resources indicated or reserved by one or more second terminals.

An example of the resource unit in which the resource or candidate resource N is located, the resource unit, and resource selection by the first terminal from the remaining resources, mentioned in this embodiment, is as follows: For example, the resource unit is a slot, and the resource or candidate resource N is symbol 1 to symbol 5 in slot 0, symbol 1 to symbol 5 in slot 1, symbol 1 to symbol 5 in slot 3, and symbol 1 to symbol 5 in slot 5. If the first terminal selects resources from slot 0 and slot 1 (that is, resource units corresponding to a part of the resource or candidate resource N), the first terminal may select resources of symbol 6 to symbol 13 in slot 0 and symbol 6 to symbol 13 in slot 1.

For example, the second terminal sends SCI indicating reservation of first a symbols in slot n, and the first terminal performs SL sensing to detect the SCI indicating reservation of slot n. In this case, the first terminal may perform resource reservation starting from at least an (a+1)th symbol in slot n. In this example, the first terminal preempts some resources with other SL terminals (for example, the second terminal), to increase a probability of successfully contending for the resource or candidate resource N by the SL system. Herein, using SL system resources as a whole, different SL terminals preferentially contend for resources on resources (such as the resource or candidate resource N) indicated by other terminals, and different terminals in the SL system avoid collisions between SL terminals in the SL system through SL sensing.

3. The first terminal selects a resource within a first channel occupancy time (COT) range of the first terminal.

In this example, a length of the selected resource is less than or equal to a length of the first COT of the first terminal. In this example, the first terminal does not need to determine whether remaining resources in the resource or candidate resource N meet a data transmission requirement, but directly selects a resource within the first COT range, where the first COT indicates resources that can be occupied, which are obtained by the first terminal through sensing.

4. The first terminal selects a resource within a second COT range of the second terminal.

This example is equivalent to sharing the second COT by the second terminal with the first terminal. In this example, a length of the selected resource is less than or equal to a difference between a length of the second COT and that of the resource or candidate resource N. In this example, the first terminal does not need to determine whether remaining resources in the resource or candidate resource N meet a data transmission requirement, but directly selects a resource within the second COT range, where the second COT indicates resources that can be occupied, which are obtained by the second terminal through sensing.

Optionally, the second COT range is a second COT range of one second terminal, or a union of second COT ranges of a plurality of second terminals.

5. The first terminal selects a resource within a union of a first COT of the first terminal and a second COT of the second terminal.

In this example, the first terminal does not need to determine whether remaining resources in the resource or candidate resource N meet a data transmission requirement, but directly selects a resource within the union of the COTs. In this example, a length of the selected resource is less than or equal to a length of the union of the COTs.

6. The first terminal selects a resource within a larger one of a first COT of the first terminal and a second COT of the second terminal.

In this example, the first terminal does not need to determine whether remaining resources in the resource or candidate resource N meet a data transmission requirement, but directly selects a resource within the larger COT, to help meet the data transmission requirement. In this example, a length of the selected resource is less than or equal to a length of the larger COT.

The foregoing 1 to 6 may be implemented separately or in combination. For example, in a case that 1 and 2 are implemented in combination, the first terminal selects a resource in the resource unit in which the resource N indicated or reserved by one or more second terminals (for example, reserving a resource of the first terminal) is located, and if the resource is insufficient to meet the data transmission requirement, may further perform CCA or LBT sensing on resources not including the resource N, to continue to select a resource.

In the foregoing examples, a position of the selected resource includes one of the following:

(1) Last K1 symbols in a slot in which the resource or candidate resource N is located, where K1 is greater than or equal to 0. For example, the resource or candidate resource N is symbol 1 to symbol 5 in slot 0, and resources that can be selected are symbol 6 to symbol 13 in slot 0.

(2) K2 symbols after a start symbol or an end symbol corresponding to the resource or candidate resource N, where K2 is greater than or equal to 0. For example, the resource or candidate resource N is symbol 1 to symbol 5 in slot 0, the start symbol corresponding to the resource or candidate resource N is symbol 1, and selected resources are symbol 1 to symbol 13 in slot 0.

(3) M slots after a slot in which the resource or candidate resource N is located, where M is greater than or equal to 0. For example, the resource or candidate resource N is symbol 1 to symbol 5 in slot 0, and selected resources are slot 2 and slot 3.

In the foregoing 2, that the first terminal selects a resource in a resource unit in which the resource or candidate resource N is located includes: if remaining resources in the resource unit in which the resource or candidate resource N is located meet a data transmission requirement of the first terminal, the first terminal selects the resource in the resource unit.

It should be noted that the transmission requirement or transmission requirement mentioned in each embodiment of this application may mean that the size of the data packet is less than a threshold, and that a priority is greater than a threshold, and that a CBR or CR is less than a threshold, and so on.

For example, the second terminal sends the SCI indicating reservation of the first a symbols in slot n (that is, the resource or candidate resource N), and the first terminal performs SL sensing to detect the SCI indicating reservation of slot n. In this case, the first terminal may select a resource starting from the (a+1)th symbol in slot n, for example, perform resource reservation.

On a basis of the foregoing 3, the method further includes: if remaining resources in the resource unit in which the resource or candidate resource N is located do not meet a data transmission requirement of the first terminal, and resources within the first COT range of the first terminal meet the data transmission requirement, selecting a resource at a position corresponding to the resource or candidate resource N.

In this example, a length of the selected resource is less than or equal to a length of the first COT of the first terminal. A position of the selected resource includes one of the following: last K1 symbols in a slot in which the resource or candidate resource N is located, or K2 symbols after a start symbol or an end symbol corresponding to the resource or candidate resource N, or M slots after a slot in which the resource or candidate resource N is located, where K1, K2, and M are greater than or equal to 0.

On a basis of the foregoing 4, the method further includes: if remaining resources in the resource unit in which the resource or candidate resource N is located do not meet a data transmission requirement of the first terminal, and resources within the second COT range of the second terminal meet the data transmission requirement, selecting a resource at a position corresponding to the resource or candidate resource N.

In this example, a resource may be selected within the second COT range. In this example, a length of the selected resource is less than or equal to a difference between a length of the second COT and that of the resource or candidate resource N.

In this example, a position of the selected resource includes one of the following: last K1 symbols in a slot in which the resource or candidate resource N is located, or K2 symbols after a start symbol or an end symbol corresponding to the resource or candidate resource N, or M slots after a slot in which the resource or candidate resource N is located, where K1, K2, and M are greater than or equal to 0.

The foregoing 4 may meet one of the following requirements during implementation:

(1) the to-be-sent data of the first terminal is a broadcast service;

(2) the to-be-sent data of the first terminal is a multicast service, and multicast members include the second terminal;

(3) the to-be-sent data of the first terminal is unicast data, and a receive end is the second terminal; and (4) a receive end of the to-be-sent data of the first terminal includes the second terminal.

On a basis of the foregoing 1 to 6, the method further includes: if remaining resources in the resource unit in which the resource or candidate resource N is located do not meet a data transmission requirement of the first terminal, determining a maximum length of an extended COT, where the maximum length of the extended COT is predefined, preconfigured, or configured, or a rule for obtaining the maximum length of the extended COT is predefined, preconfigured, or configured.

Optionally, the maximum length of the extended COT includes at least one of the following: a maximum extensible length of the first COT of the first terminal; a maximum extensible length of the second COT of the second terminal; or a larger one of maximum extensible lengths of the first COT of the first terminal and the second COT of the second terminal.

For example, the second terminal reserves the second COT, and the first terminal shares the second COT and extends the second COT to the first COT. The system can specify a maximum extensible length for each terminal, all terminals, or a last terminal.

Solution 2:

In this solution, the SL terminal may reserve resources in the discontinuous resource reservation manner.

Optionally, each of the following methods in the solution 2 may be implemented in a case that the method meets at least one of the following that:

(1) the SL terminal uses discontinuous resource selection in time domain;

(2) an HARQ feedback mechanism is enabled for an SL;

(3) a PSFCH period in an SL is set to a non-zero value; or (4) a size of a data packet meets a second preset condition, for example, a size of a data packet of the to-be-sent data is less than a second value.

Optionally, in the solution 2, in a case that the first terminal has to-be-sent data, the method may further include at least one of the following steps 1 and 2 after S204.

1. The first terminal excludes the resource or candidate resource N, and resources of A resource units after the resource or candidate resource N.
2. Perform CCA or LBT sensing in B resource units after the resource or candidate resource N.

A and B are values greater than or equal to 1. In an example, A and B may be predefined, preconfigured, or configured values.

In this embodiment, assuming that the first terminal needs to perform CCA by itself before selecting a resource, CCA needs to be performed on at least the next slot of the resource or candidate resource N, and the resource reservation of the first terminal cannot reserve a corresponding resource (that is, the next slot of the resource or candidate resource N). Therefore, the next slot of the resource N cannot be used as a resource in a candidate resource window of the first terminal.

Optionally, in the solution 2, in a case that the first terminal has to-be-sent data, the method may further include the following step after S204: The first terminal determines, based on remaining resources in a resource unit in which the resource or candidate resource N is located, whether to select a resource in the resource unit in which the resource or candidate resource N is located. The following describes three examples.

In a first example, if the first terminal has remaining resources in the resource unit in which the resource or candidate resource N is located, or the first terminal has remaining resources in the resource unit in which the resource or candidate resource N is located and the remaining resources meet a transmission requirement of the to-be-sent data, the method further includes at least one of the following:

(1) The first terminal performs CCA or LBT sensing in one or more resource units before the resource or candidate resource N.

In this embodiment, the SL sensing in S202 may be performed first, and then the CCA or LBT sensing is performed.

In this embodiment, the first terminal can help other terminals preempt channels together. This increases a probability of successfully preempting resources by SL terminals, and reliability is high. In other embodiments, the first terminal may not perform CCA or LBT sensing, but rely on the second terminal to preempt resources. This helps save power of the first terminal.

(2) The first terminal excludes frequency domain resources selected by other terminals in a time domain unit in which the resource or candidate resource N is located, and selects a frequency domain resource in the time domain unit in which the resource or candidate resource N is located.

(3) The first terminal excludes resources selected by other terminals in the resource unit in which the resource or candidate resource N is located, and selects a resource in the resource unit in which the resource or candidate resource N is located.

In this embodiment, a difference between (3) and (2) lies in that: (2) specifically refers to selecting different frequency domain resources on a same time domain resource; (3) is to select a resource that does not overlap the resource or candidate resource N.

It should be noted that the transmission requirement or transmission requirement mentioned in each embodiment of this application may mean that the size of the data packet is less than a threshold, and that a priority is greater than a threshold, and that a CBR or CR is less than a threshold, and so on.

In a second example, if the first terminal has remaining resources in the resource unit in which the resource or candidate resource N is located and the remaining resources do not meet a transmission requirement of the to-be-sent data, the method further includes at least one of the following that:

(1) The first terminal selects a frequency domain resource in a time domain unit corresponding to the resource or candidate resource N.

(2) The first terminal performs CCA or LBT sensing after the resource unit in which the resource or candidate resource N is located.

In this example, in a case that (1) and (2) are combined, a resource in the resource unit in which the resource N is located is selected for sending a part of data of the first terminal; and for another part of data, CCA or LBT sensing is first performed, and the remaining data is transmitted after an available resource is detected.

In a third example, if the first terminal does not have remaining resources in the resource unit in which the resource or candidate resource N is located, or the first terminal has remaining resources in the resource unit in which the resource or candidate resource N is located but the remaining resources do not meet a transmission requirement of the to-be-sent data, the first terminal excludes the resource or candidate resource N, and A resource units after the resource or candidate resource N, where A is a value greater than or equal to 1.

In this example, the resource or candidate resource N, and resources of A resource units after the resource or candidate resource N may be directly excluded; or a part of data is transmitted in the resource unit in which the resource N is located, and for another part, CCA or LBT sensing is first performed, and the another part is transmitted after an available resource is detected.

Optionally, in the solution 2, the first terminal has to-be-sent data, and when selecting, indicating, or reserving a resource, the first terminal uses at least one of the following access modes:

(1) A type-1 channel access mode. The channel access mode in this example may be used when the first terminal has obtained a channel and a transmission switching interval is less than specific duration (such as 16 microsecond (s)).

(2) A type-2 channel access mode. For example, a channel is monitored for specific duration (such as 25 s). This channel access mode may be used to obtain a channel for a specific signal. A maximum continuous transmission length should be less than a value, such as 1 ms.

(3) Retransmission of the first terminal is sent on a time domain resource corresponding to the resource or candidate resource N.

In this example, the resource N indicated or reserved by the second terminal is obtained based on the SL sensing, and the data retransmitted by the first terminal is sent on the time domain resource corresponding to the resource or candidate resource N.

Optionally, the first terminal may further determine the described access mode in (1) to (3) according to a predefined, preconfigured, or configured rule.

The foregoing mainly describes the method for determining a resource in a shared band according to this embodiment of this application with reference to the solution 1 and the solution 2. The following describes conditions to which the foregoing solutions are both applicable.

The SL sensing mentioned in each of the foregoing embodiments may include detecting a PSCCH or detecting SCI, where the PSCCH or the SCI carries information about one or more time domain resources and/or frequency domain resources, or information about one or more resources.

For example, if SCI sent by the second terminal indicates that resources in candidate resources slot x1 and slot x2 are reserved, and the frequency domain resource indicates interlace (interlace) y1, other terminals (such as the first terminal) consider that the SCI indicates resources of interlace y1 in slot x1 and interlace y1 in slot x2; or the SCI indicates that resources of three slots starting from candidate resource slot x1 are reserved, and indicates resources of interlace y1 in frequency domain, other terminals (such as the first terminal) consider that the SCI indicates resources of interlace y1 in slot x1, interlace y1 in slot x1+1, and interlace y1 in slot x1+2.

Optionally, a relationship between the time domain resource and the frequency domain resource is a predefined rule, or a preconfigured or configured rule. For example, the first terminal obtains N time domain resources according to the time domain resource indication, and obtains Y frequency domain resources according to the frequency domain resource indication, where the N time domain resources are in a one-to-one or one-to-many or many-to-one correspondence with the Y frequency domain resources.

The information about the time domain resource and/or frequency domain resource, or the information about the resource includes at least one of the following: a resource occupied by the second terminal; a start position of a second COT of the second terminal; an end position of a second COT of the second terminal; or a length of a second COT of the second terminal.

In this embodiment, for example, by using the SCI, the second terminal indicates that the length of the second COT is four slots, and the second terminal indicates that the first three slots are occupied. In this case, other SL terminals (such as the first terminal) detect the SCI and may also consider the fourth slot for information transmission.

In each of the foregoing embodiments, after the first terminal selects the resource, the first terminal may further send a PSCCH or SCI, where the PSCCH or the SCI carries information about one or more time domain resources and/or frequency domain resources, or information about one or more resources.

For example, if the SCI sent by the first terminal indicates that resources in candidate resources slot x1 and slot x2 are reserved, and the frequency domain resource indicates interlace y1, other terminals (such as the second terminal) consider that the SCI indicates resources of interlace y1 in slot x1 and interlace y1 in slot x2; or the SCI indicates that resources of three slots starting from candidate resource slot x1 are reserved, and the frequency domain indicates resources of interlace y1, other terminals (such as the second terminal) consider that the SCI indicates resources of interlace y1 in slot x1, interlace y1 in slot x1+1, and interlace y1 in slot x1+2.

Optionally, a relationship between the time domain resource and the frequency domain resource is a predefined rule, or a preconfigured or configured rule. For example, the other SL terminals may obtain N time domain resources according to the time domain resource indication, and obtain Y frequency domain resources according to the frequency domain resource indication, where the N time domain resources are in a one-to-one or one-to-many or many-to-one correspondence with the Y frequency domain resources.

The information about the time domain resource and/or frequency domain resource, or the information about the resource includes at least one of the following: a resource occupied by the first terminal; a start position of a first COT of the first terminal; an end position of a first COT of the first terminal; or a length of a first COT of the first terminal.

The information about the time domain resource and/or frequency domain resource mentioned in each of the foregoing examples includes at least one of the following: a time domain pattern; a start position of the time domain resource; an end position of the time domain resource; a length of the time domain resource; a frequency domain resource interlace index; a frequency domain resource interlace quantity; a start index of a frequency domain resource interlace; an end index of a frequency domain resource interlace; a start position of the frequency domain resource; an end position of the frequency domain resource; a size of the frequency domain resource; or a bandwidth occupied by the frequency domain resource.

Optionally, each of the foregoing embodiments may further include the following step: The first terminal receives data on at least one of the following resources: a resource indicated by a PSCCH or SCI; a resource reserved by a PSCCH or SCI; or a resource or candidate resource indicated by a PSCCH or SCI. In this embodiment, when the first terminal receives data, it is possible that the second terminal (sending terminal) does not actually preempt a resource, and therefore the second terminal cannot send data. Therefore, some of the data received by the first terminal in this embodiment may be blindly detected.

It should be noted that the resource units mentioned in each embodiment of this application may be L1 symbols, L2 slots, L3 subframes, L4 frames, COTs, L5 microseconds, L6 milliseconds, L7 seconds, and the like, where L1, L2, L3, L4, L5, L6, and L7 are values greater than or equal to 1, and resource units described in different positions may be different.

To describe the method for determining a resource in a shared band according to this embodiment of this application, the following provides descriptions with reference to several embodiments.

Figure 3:
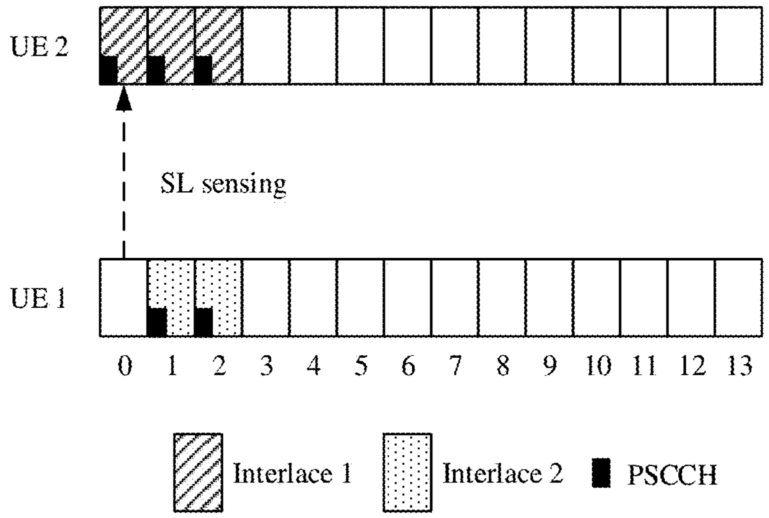
FIG. 3 is a schematic diagram of an application of a method for determining a resource in a shared band according to an embodiment of this application.

Embodiment 1: UE 1 Selects Resources from Candidate Resources Indicated by Other Terminals As shown in FIG. 3, a second terminal (UE 2) occupies interlace 1 in slot 0, slot 1, and slot 2 in an unlicensed band, and indicates or reserves, through SCI carried by a PSCCH in slot 0, resources of slot 0, slot 1, and slot 2, corresponding to the resource or candidate resource N in the foregoing embodiment.

UE 1 detects the SCI at a start position of each slot. If it is detected in slot 0 that UE 2 has reserved resources of slot 0, slot 1, and slot 2, UE 1 selects interlace 2 in slot 1 and slot 2 for sending data.

It should be noted that interlaces selected by UE 1 in different slots may be the same or different. This is not limited herein. In FIG. 3, same interlaces are used for illustration.

Figure 4:
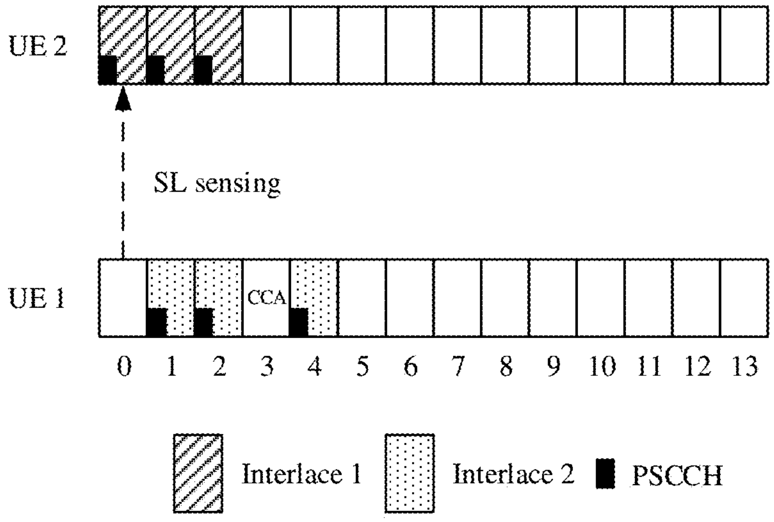
FIG. 4 is a schematic diagram of an application of a method for determining a resource in a shared band according to an embodiment of this application.

Embodiment 2: UE 1 Selects Resources from Candidate Resources Indicated by Other Terminals and Performs CCA As shown in FIG. 4, a second terminal (UE 2) occupies interlace 1 in slot 0, slot 1, and slot 2 in an unlicensed band, and indicates or reserves, through SCI carried by a PSCCH in slot 0, resources of slot 0, slot 1, and slot 2, corresponding to the resource or candidate resource N in the foregoing embodiment.

UE 1 detects the SCI at a start position of each slot. It is detected in slot 0 that UE 2 has reserved or indicated the resources of slot 0, slot 1, and slot 2. If UE 1 requires resources of three slots in time domain, UE 1 selects interlace 2 in slot 1 and slot 2 for sending data. CCA is performed starting from slot 3, and data is transmitted in a successfully accessed slot or a next slot. In FIG. 4, UE 1 successfully accesses slot 3 and selects interlace 2 to transmit information in slot 4.

It should be noted that in this embodiment, it is considered that UE 2 preempts the resources of slot 0 to slot 2. Therefore, SL UE 1 can occupy the resources in slot 1 and slot 2. In a case of resource insufficiency, UE 1 needs to perform CCA or LBT sensing before sending remaining data.

Embodiment 3: Reserved Resource of UE 1 are within a Second COT Range of UE 2

Figure 5:
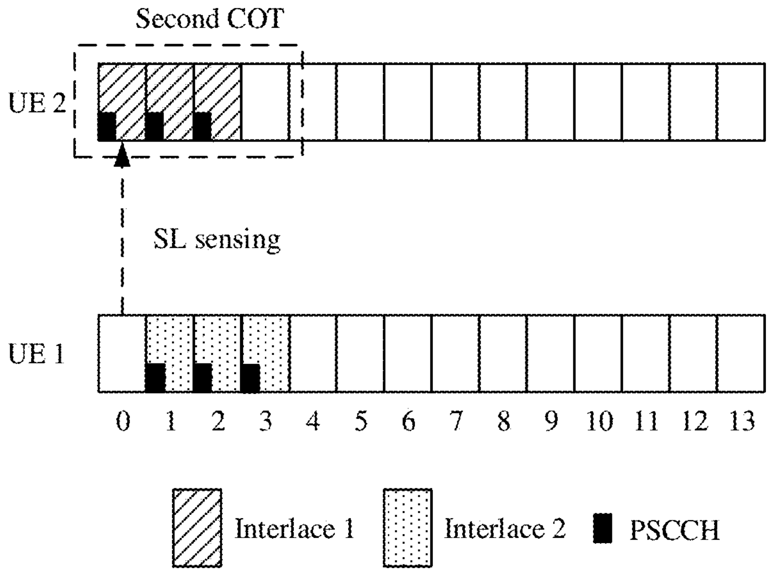
FIG. 5 is a schematic diagram of an application of a method for determining a resource in a shared band according to an embodiment of this application.

As shown in FIG. 5, a second terminal (UE 2) occupies interlace 1 in slot 0, slot 1, and slot 2 in an unlicensed band, and indicates or reserves, through SCI carried by a PSCCH in slot 0, resources of slot 0, slot 1, and slot 2, corresponding to the resource or candidate resource N in the foregoing embodiment. The second COT range of UE 2 is four slots from slot 0 to slot 3.

UE 1 detects the SCI at a start position of each slot. It is detected in slot 0 that UE 2 has reserved the resources of slot 0, slot 1, and slot 2. If UE 1 requires resources of three slots in time domain, UE 1 obtains slot 3 within the COT range of UE 2 based on SL sensing. In this case, UE 1 selects interlace 2 in slot 1, slot 2, and slot 3 for sending data.

Embodiment 4: UE 1 Excludes a Resource or Candidate Resource N and Resources of a Next Slot Thereof As shown in FIG. 6, a second terminal (UE 2) occupies interlace 1 in slot 0, slot 1, and slot 2 in an unlicensed band, and indicates or reserves, through SCI carried by a PSCCH in slot 0, resources of slot 0, slot 1, and slot 2, corresponding to the resource or candidate resource N in the foregoing embodiment.

UE 1 performs SL sensing in slot 0, and detects in slot 0 that UE 2 has reserved or indicated the resources of slot 0, slot 1, and slot 2. In this case, UE 1 excludes resources of slot 0 to slot 2 and resources of slot 3 (that is, the next slot of the resource N), indicating that these resources cannot be used as candidate resources for UE 1.

Figure 6:
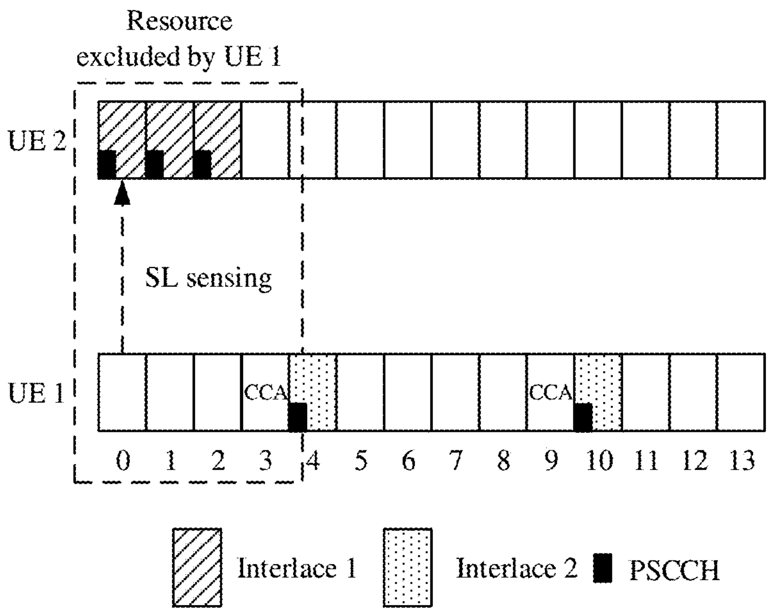
FIG. 6 is a schematic diagram of an application of a method for determining a resource in a shared band according to an embodiment of this application.

In FIG. 6, UE 1 successfully accesses slot 3 and selects interlace 2 to transmit information in slot 4. UE 1 indicates or reserves, through SCI carried by a PSCCH in slot 4, resources of slot 10.

Figure 7:
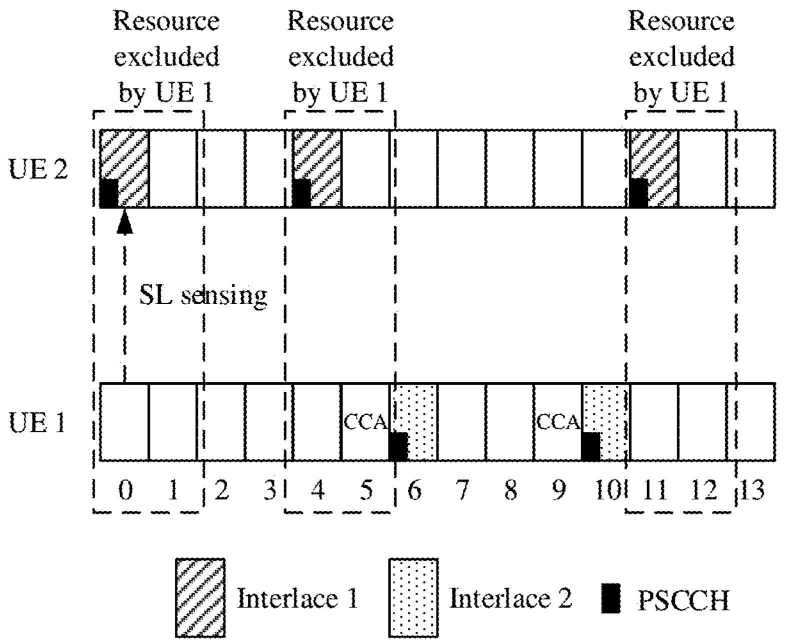
FIG. 7 is a schematic diagram of an application of a method for determining a resource in a shared band according to an embodiment of this application.

FIG. 6 is an example of discontinuous resource allocation, and the following describes the example of continuous resource allocation with reference to FIG. 7.

As shown in FIG. 7, UE 2 occupies interlace 1 in slot 0, slot 4, and slot 11 in the unlicensed band, and indicates or reserves, through the SCI carried in slot 0, resources of slot 0, slot 4, and slot 11.

UE 1 performs SL sensing in slot 0, and detects in slot 0 that UE 2 has reserved or indicated the resources of slot 0, slot 4, and slot 11 (that is, the resource or candidate resource N). In this case, UE 1 excludes resources of slot 0, slot 4, slot 11, and slot 1, slot 5, and slot 12 (that is, a next slot of the resource or candidate resource N), indicating that these resources cannot be used as candidate resources for UE 1. In a case that an SL supports discontinuous resource allocation, this exclusion manner causes reduction of candidate resources for UE 1.

Figure 8:
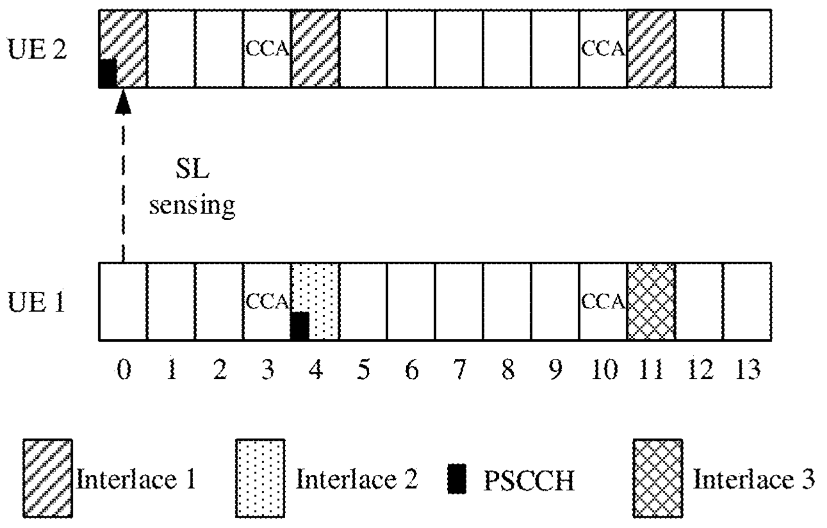
FIG. 8 is a schematic diagram of an application of a method for determining a resource in a shared band according to an embodiment of this application.

Embodiment 5: UE 1 Performs Discontinuous Transmission, and Selects Resources on Resources Reserved by Other Terminals As shown in FIG. 8, UE 2 occupies interlace 1 in slot 0, slot 4, and slot 11 in an unlicensed band, and indicates or reserves, through SCI carried in slot 0, resources of slot 0, slot 4, and slot 11.

UE 1 performs SL sensing in slot 0, and detects in slot 0 that UE 2 has reserved or indicated the resources of slot 0, slot 4, and slot 11. UE 1 selects resources in slot 4 and slot 11 to send data, occupies interlace 2 in slot 4, and occupies interlace 3 in slot 11.

It should be noted that the method for determining a resource in a shared band according to the embodiments of this application may be performed by an apparatus for determining a resource in a shared band, or a control module configured to perform the method for determining a resource in a shared band in the apparatus for determining a resource in a shared band. In the embodiments of this application, an apparatus for determining a resource in a shared band according to an embodiment of this application is described by using an example in which the method for determining a resource in a shared band is performed by the apparatus for determining a resource in a shared band.

Figure 9:
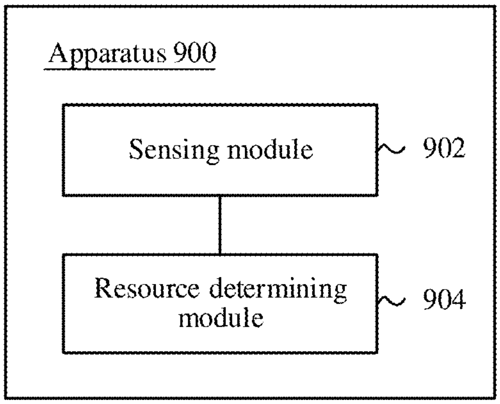
FIG. 9 is a schematic diagram of a structure of an apparatus for determining a resource in a shared band according to an embodiment of this application.

FIG. 9 is a schematic diagram of a structure of an apparatus for determining a resource in a shared band according to an embodiment of this application. The apparatus may correspond to a terminal in other embodiments. As shown in FIG. 9, the apparatus 900 includes the following modules:

- a sensing module 902, which may be configured to perform SL sensing; and
- a resource determining module 904, which may be configured to determine, based on the SL sensing, a resource or candidate resource N indicated or reserved by a second terminal.

In this embodiment of this application, the apparatus 900 determines, based on the SL sensing, the resource or candidate resource N indicated or reserved by the second terminal. In this way, the apparatus 900 can further perform resource selection based on the resource or candidate resource N or the like. This helps increase a channel access probability in the shared band. In addition, the apparatus 900 can implement OFDMA to improve utilization of system resources.

Optionally, in an embodiment, the apparatus has to-be-sent data, and the resource determining module 904 may be configured to perform at least one of the following:

- performing clear channel assessment CCA or listen before talk LBT sensing on a first resource;
- selecting a resource in a resource unit in which the resource or candidate resource N is located;
- selecting a resource within a first channel occupancy time COT range of the apparatus;
- selecting a resource within a second COT range of the second terminal;
- selecting a resource within a union of a first COT of the apparatus and a second COT of the second terminal; or
- selecting a resource within a larger one of a first COT of the apparatus and a second COT of the second terminal.

Optionally, in an embodiment, the first resource includes at least one of the following:

- a resource not including the resource or candidate resource N;
- a remaining resource after the resource or candidate resource N is excluded;
- candidate resources; or
- a part of candidate resources.

Optionally, in an embodiment, the selecting a resource in a resource unit in which the resource or candidate resource N is located includes: if remaining resources in the resource unit in which the resource or candidate resource N is located meet a data transmission requirement of the apparatus, selecting the resource in the resource unit.

Optionally, in an embodiment, the resource determining module 904 may be further configured to: if remaining resources in the resource unit in which the resource or candidate resource N is located do not meet a data transmission requirement of the apparatus, and resources within the first COT range of the apparatus meet the data transmission requirement, select a resource at a position corresponding to the resource or candidate resource N.

Optionally, in an embodiment, a length of the selected resource is less than or equal to a length of the first COT of the apparatus; and/or a position of the selected resource includes one of the following: last K1 symbols in a slot in which the resource or candidate resource N is located, or K2 symbols after a start symbol or an end symbol corresponding to the resource or candidate resource N, or M slots after a slot in which the resource or candidate resource N is located, where K1, K2, and M are greater than or equal to 0.

Optionally, in an embodiment, the resource determining module 904 may be further configured to: if remaining resources in the resource unit in which the resource or candidate resource N is located do not meet a data transmission requirement of the apparatus, and resources within the second COT range of the second terminal meet the data transmission requirement, select a resource at a position corresponding to the resource or candidate resource N.

Optionally, in an embodiment, a length of the selected resource is less than or equal to a difference between a length of the second COT and that of the resource or candidate resource N; and/or a position of the selected resource includes one of the following: last K1 symbols in a slot in which the resource or candidate resource N is located, or K2 symbols after a start symbol or an end symbol corresponding to the resource or candidate resource N, or M slots after a slot in which the resource or candidate resource N is located, where K1, K2, and M are greater than or equal to 0.

Optionally, in an embodiment, the to-be-sent data is a broadcast service; the to-be-sent data is a multicast service, and multicast members include the second terminal; the to-be-sent data is unicast data, and a receive end is the second terminal; or a receive end of the to-be-sent data includes the second terminal.

Optionally, in an embodiment, the second COT range is a second COT range of one second terminal, or a union of second COT ranges of a plurality of second terminals.

Optionally, in an embodiment, the resource determining module 904 may be further configured to: if remaining resources in the resource unit in which the resource or candidate resource N is located do not meet a data transmission requirement of the apparatus, determine a maximum length of an extended COT, where the maximum length of the extended COT is predefined, preconfigured, or configured, or a rule for obtaining the maximum length of the extended COT is predefined, preconfigured, or configured.

Optionally, in an embodiment, the maximum length of the extended COT includes at least one of the following: a maximum extensible length of the first COT of the apparatus; a maximum extensible length of the second COT of the second terminal; or a larger one of maximum extensible lengths of the first COT of the apparatus and the second COT of the second terminal.

Optionally, in an embodiment, the apparatus meets at least one of the following that: an SL terminal uses continuous resource selection in time domain; a hybrid automatic repeat request HARQ feedback mechanism is disabled for an SL system; an SL uses blind retransmission; an SL channel busy rate CBR or channel occupancy rate CR is greater than or equal to a preset value; or a size of a data packet meets a first preset condition.

Optionally, in an embodiment, the apparatus has to-be-sent data, and the resource determining module 904 may be configured to perform at least one of the following: excluding the resource or candidate resource N, and resources of A resource units after the resource or candidate resource N; or performing CCA or LBT sensing in B resource units after the resource or candidate resource N, where A and B are values greater than or equal to 1.

Optionally, in an embodiment, the apparatus has to-be-sent data, and the resource determining module 904 may be configured to determine, based on remaining resources in a resource unit in which the resource or candidate resource N is located, whether to select a resource in the resource unit in which the resource or candidate resource N is located.

Optionally, in an embodiment, if the apparatus has remaining resources in the resource unit in which the resource or candidate resource N is located, or the apparatus has remaining resources in the resource unit in which the resource or candidate resource N is located and the remaining resources meet a transmission requirement of the to-be-sent data, the resource determining module 904 may be configured to perform at least one of the following: performing CCA or LBT sensing in one or more resource units before the resource or candidate resource N; excluding frequency domain resources selected by other terminals in a time domain unit in which the resource or candidate resource N is located, and selecting a frequency domain resource in the time domain unit in which the resource or candidate resource N is located; or excluding resources selected by other terminals in the resource unit in which the resource or candidate resource N is located, and selecting a resource in the resource unit in which the resource or candidate resource N is located.

Optionally, in an embodiment, if the apparatus has remaining resources in the resource unit in which the resource or candidate resource N is located and the remaining resources do not meet a transmission requirement of the to-be-sent data, the resource determining module 904 may be configured to perform at least one of the following: selecting a frequency domain resource in a time domain unit corresponding to the resource or candidate resource N; or performing CCA or LBT sensing after the resource unit in which the resource or candidate resource N is located.

Optionally, in an embodiment, if the apparatus does not have remaining resources in the resource unit in which the resource or candidate resource N is located, or the apparatus has remaining resources in the resource unit in which the resource or candidate resource N is located but the remaining resources do not meet a transmission requirement of the to-be-sent data, the apparatus excludes the resource or candidate resource N, and A resource units after the resource or candidate resource N, where A is a value greater than or equal to 1.

Optionally, in an embodiment, the apparatus has to-be-sent data, and when selecting, indicating, or reserving a resource, the apparatus uses at least one of the following access modes: a type-1 channel access mode; a type-2 channel access mode; or data retransmitted by the apparatus is sent on a time domain resource corresponding to the resource or candidate resource N.

Optionally, in an embodiment, the resource determining module 904 may be configured to determine the access mode according to a predefined, preconfigured, or configured rule.

Optionally, in an embodiment, the apparatus meets at least one of the following that: an SL terminal uses discontinuous resource selection in time domain; an HARQ feedback mechanism is enabled for an SL; a PSFCH period in an SL is set to a non-zero value; or a size of a data packet meets a second preset condition.

Optionally, in an embodiment, the SL sensing includes detecting a PSCCH or detecting SCI, where the PSCCH or the SCI carries information about one or more time domain resources and/or frequency domain resources, or information about one or more resources.

Optionally, in an embodiment, the information about the time domain resource and/or frequency domain resource, or the information about the resource includes at least one of the following: a resource occupied by the second terminal; a start position of a second COT of the second terminal; an end position of a second COT of the second terminal; or a length of a second COT of the second terminal.

Optionally, in an embodiment, the apparatus further includes a sending module, configured to send a PSCCH or SCI, where the PSCCH or the SCI carries information about one or more time domain resources and/or frequency domain resources, or information about one or more resources.

Optionally, in an embodiment, the information about the time domain resource and/or frequency domain resource, or the information about the resource includes at least one of the following: a resource occupied by the apparatus; a start position of a first COT of the apparatus; an end position of a first COT of the apparatus; or a length of a first COT of the apparatus.

Optionally, in an embodiment, the information about the time domain resource and/or frequency domain resource includes at least one of the following: a time domain pattern; a start position of the time domain resource; an end position of the time domain resource; a length of the time domain resource; a frequency domain resource interlace index; a frequency domain resource interlace quantity; a start index of a frequency domain resource interlace; an end index of a frequency domain resource interlace; a start position of the frequency domain resource; an end position of the frequency domain resource; a size of the frequency domain resource; or a bandwidth occupied by the frequency domain resource.

Optionally, in an embodiment, a relationship between the time domain resource and the frequency domain resource is a predefined rule, or a preconfigured or configured rule.

Optionally, in an embodiment, the apparatus further includes a receiving module, configured to receive data on at least one of the following resources: a resource indicated by a PSCCH or SCI; a resource reserved by a PSCCH or SCI; or a resource or candidate resource indicated by a PSCCH or SCI.

Optionally, in an embodiment, the SL sensing includes at least one of the following: detecting a PSCCH; detecting SCI; detecting a physical sidelink feedback channel PSFCH; detecting an acknowledgment ACK or a negative acknowledgment NACK; detecting a wake-up signal WUS; detecting a random access preamble sequence; detecting reference signal received power RSRP; comparing RSRP with a threshold; CCA or LBT sensing; detecting a received signal strength indicator RSSI; detecting energy; detecting a predefined, preconfigured, or configured sequence; or detecting a predefined, preconfigured, or configured position.

Optionally, in an embodiment, the sensing module 902 may be configured to perform SL sensing when the apparatus has to-be-sent data or to-be-received data.

Optionally, in an embodiment, a position of the SL sensing is determined based on at least one of the following: a time-frequency domain resource of a PSCCH configured in an SL resource pool; a predefined, preconfigured, or configured time domain resource position and/or frequency domain resource position; or a redefined, preconfigured, or configured resource position.

For the apparatus 900 in this embodiment of this application, refer to the processes of the method 200 in the corresponding embodiment of this application. In addition, the units/modules of the apparatus 900 and other operations and/or functions described above are used to implement the corresponding processes in the method 200, with the same or equivalent technical effect achieved. For brevity, details are not described herein again.

The apparatus for determining a resource in a shared band in this embodiment of this application may be an apparatus, an apparatus with an operating system, or an electronic device, or may be a component, an integrated circuit, or a chip in a terminal. The apparatus or the electronic device may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The apparatus for determining a resource in a shared band according to this embodiment of this application can implement each process implemented by the method embodiment in FIG. 2, with the same technical effect achieved. To avoid repetition, details are not described herein again.

Figure 10:
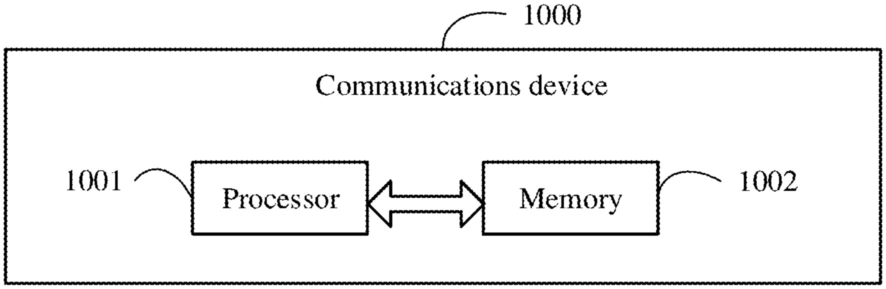
FIG. 10 is a schematic diagram of a structure of a communications device according to an embodiment of this application.

Optionally, as shown in FIG. 10, an embodiment of this application further provides a communications device 1000, including a processor 1001, a memory 1002, and a program or instructions stored in the memory 1002 and capable of running on the processor 1001. For example, when the communications device 1000 is a terminal, and the program or instructions are executed by the processor 1001, each process of the foregoing embodiment of the method for determining a resource in a shared band is implemented, with the same technical effect achieved. To avoid repetition, details are not described herein again.

Figure 11:
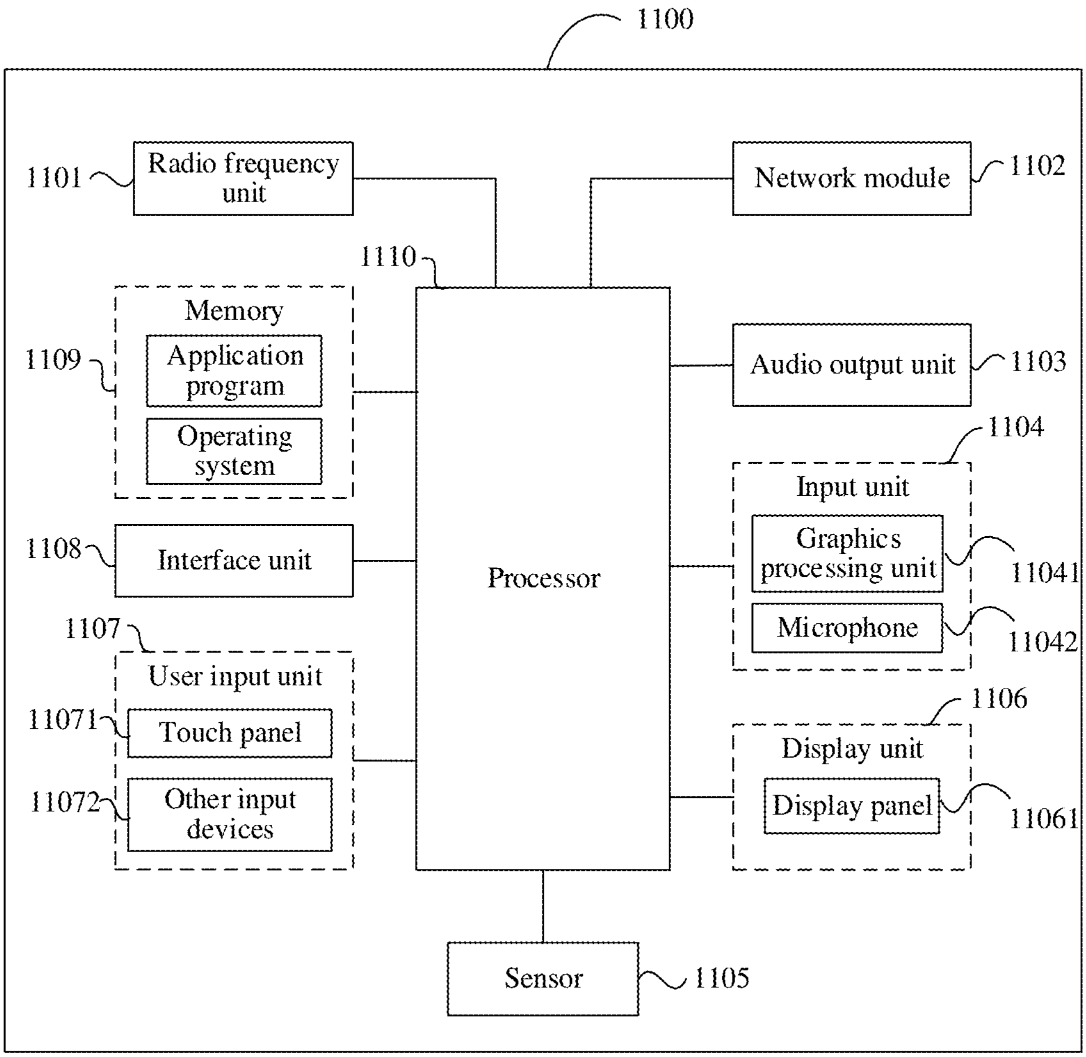
FIG. 11 is a schematic diagram of a structure of a terminal according to an embodiment of this application.

An embodiment of this application further provides a terminal. The terminal includes a processor and a communications interface. The processor is configured to: perform SL sensing; and determine, based on the SL sensing, a resource or candidate resource N indicated or reserved by a second terminal. The terminal embodiment corresponds to the foregoing terminal-side method embodiment, and each implementation process and implementation of the foregoing method embodiment can be applied to the terminal embodiment, with the same technical effect achieved. Optionally, FIG. 11 is a schematic diagram of a hardware structure of a terminal for implementing an embodiment of this application.

The terminal 1100 includes but is not limited to at least some components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art may understand that the terminal 1100 may further include a power supply (for example, a battery) supplying power to all components. Optionally, the power supply may be logically connected to the processor 1110 through a power management system. In this way, functions such as charge management, discharge management, and power consumption management are implemented by using the power management system. The terminal structure shown in FIG. 11 does not constitute a limitation on the terminal. The terminal may include more or fewer components than those shown in the figure, or some components are combined, or component arrangements are different. Details are not described herein again.

It should be understood that, in this embodiment of this application, the input unit 1104 may include a graphics processing unit (GPU) 11041 and a microphone 11042. The graphics processing unit 11041 processes image data of a still picture or video obtained by an image capture apparatus (such as a camera) in a video capture mode or an image capture mode. The display unit 1106 may include a display panel 11061, and the display panel 11061 may be configured in a form of a liquid crystal display, an organic light-emitting diode, or the like. The user input unit 1107 includes a touch panel 11071 and other input devices 11072. The touch panel 11071 is also referred to as a touchscreen. The touch panel 11071 may include two parts: a touch detection apparatus and a touch controller. The other input devices 11072 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 1101 sends the downlink data to the processor 1110 for processing, and in addition, sends uplink data to the network-side device. Generally, the radio frequency unit 1101 includes but is not limited to an antenna, at least one amplifier, a transceiver, a coupler, a low noise amplifier, a duplexer, and the like.

The memory 1109 may be configured to store software programs or instructions and various data. The memory 1109 may primarily include a program or instruction storage area and a data storage area. The program or instruction storage area may store an operating system, an application program or instructions (such as an audio play function and an image play function) required by at least one function, and the like. In addition, the memory 1109 may include a high-speed random access memory, and may further include a non-transitory memory. The non-transitory memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-transitory solid-state storage device.

The processor 1110 may include one or more processing units. Optionally, the processor 1110 may integrate an application processor and a modem processor. The application processor mainly processes the operating system, a user interface, an application program, or an instruction. The modem processor mainly processes wireless communication. For example, the modem processor is a baseband processor. It may be understood that the modem processor may alternatively be not integrated in the processor 1110.

The processor 1110 may be configured to: perform SL sensing; and determine, based on the SL sensing, a resource or candidate resource N indicated or reserved by a second terminal.

In this embodiment of this application, the terminal determines, based on the SL sensing, the resource or candidate resource N indicated or reserved by the second terminal. In this way, the terminal can further perform resource selection based on the resource or candidate resource N or the like. This helps increase a channel access probability in the shared band. In addition, the terminal can implement OFDMA to improve utilization of system resources.

The terminal 1100 provided in this embodiment of this application can further implement each process of the foregoing embodiment of the method for determining a resource in a shared band, with the same technical effect achieved. To avoid repetition, details are not described herein again.

An embodiment of this application further provides a non-transitory readable storage medium. The non-transitory readable storage medium stores a program or instructions. When the program or instructions are executed by a processor, each process of the foregoing embodiment of the method for determining a resource in a shared band is implemented, with the same technical effect achieved. To avoid repetition, details are not described herein again.

The processor may be a processor in the terminal in the foregoing embodiment. The non-transitory readable storage medium includes a non-transitory computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions to implement each process of the foregoing embodiment of the method for determining a resource in a shared band, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a non-transitory storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A method for determining a resource in a shared band, comprising:

performing, by a first terminal, sidelink (SL) sensing;

determining, by the first terminal based on the SL sensing, a resource N indicated by a second terminal; and selecting, by the first terminal, a resource within a channel occupancy time (COT) range of the second terminal;

wherein a position of the selected resource comprises K2 symbols after a start symbol corresponding to the resource N, and K2 is greater than 0.

2. The method according to claim 1, wherein the first terminal has to-be-sent data, and the method further comprises:

performing, by the first terminal, clear channel assessment (CCA) on a first resource.

3. The method according to claim 2, wherein the first resource comprises at least one of the following:

a resource not comprising the resource N;

a remaining resource after the resource N is excluded;

candidate resources; or a part of candidate resources.

4. The method according to claim 2, wherein the to-be-sent data is a multicast service, and multicast members comprise the second terminal; or the to-be-sent data is unicast data, and a receive end is the second terminal.

5. The method according to claim 2, wherein the method meets at least one of the following that:

a sidelink (SL) terminal uses continuous resource selection in time domain;

a hybrid automatic repeat request (HARQ) feedback mechanism is disabled for an SL system;

an SL uses blind retransmission;

an SL channel busy rate (CBR) or channel occupancy rate (CR) is greater than or equal to a preset value; or a size of a data packet meets a first preset condition.

6. The method according to claim 1, wherein the first terminal has to-be-sent data, and the method further comprises:

performing CCA in B resource units after the resource N, wherein

B is a value greater than or equal to 1.

7. The method according to claim 1, wherein the first terminal has to-be-sent data, and when selecting a resource, the first terminal uses at least one of the following access modes:

a type-1 channel access mode;

a type-2 channel access mode; or data retransmitted by the first terminal is sent on a time domain resource corresponding to the resource N.

8. The method according to claim 6, wherein the method meets at least one of the following that:

an SL terminal uses discontinuous resource selection in time domain;

an HARQ feedback mechanism is enabled for an SL;

a physical sidelink feedback channel (PSFCH) period in an SL is set to a non-zero value; or a size of a data packet meets a second preset condition.

9. The method according to claim 1, wherein the method further comprises:

sending a physical sidelink control channel (PSCCH) or sidelink control information (SCI), wherein the PSCCH or the SCI carries information about one or more time domain resources and/or frequency domain resources, or information about one or more resources; and the information about the time domain resource and/or frequency domain resource, or the information about the resource comprises at least one of the following:

a resource occupied by the first terminal;

a start position of a first COT of the first terminal;

an end position of a first COT of the first terminal; or a length of a first COT of the first terminal.

10. The method according to claim 1, wherein the method further comprises:

receiving data on at least one of the following resources: a resource indicated by a PSCCH or SCI; a resource reserved by a PSCCH or SCI; or a resource or candidate resource indicated by a PSCCH or SCI.

11. A first terminal, comprising a processor, a memory, and a program or instructions stored in the memory and capable of running on the processor, wherein the program or instructions, when executed by the processor, causes the first terminal to perform:

performing sidelink (SL) sensing;

determining, based on the SL sensing, a resource N indicated by a second terminal; and selecting a resource within a channel occupancy time (COT) range of the second terminal;

wherein a position of the selected resource comprises K2 symbols after a start symbol corresponding to the resource N, and K2 is greater than 0.

12. A non-transitory readable storage medium, wherein the non-transitory readable storage medium stores a program or instructions, and the program or instructions, when executed by a processor of a first terminal, causes the first terminal to perform:

performing sidelink (SL) sensing;

determining, based on the SL sensing, a resource N indicated by a second terminal; and selecting a resource within a channel occupancy time (COT) range of the second terminal;

wherein a position of the selected resource comprises K2 symbols after a start symbol corresponding to the resource N, and K2 is greater than 0.

13. The first terminal according to claim 11, wherein the first terminal has to-be-sent data, and the first terminal is further configured to perform clear channel assessment (CCA) on a first resource.

14. The first terminal according to claim 13, wherein the to-be-sent data is a multicast service, and multicast members comprise the second terminal; or the to-be-sent data is unicast data, and a receive end is the second terminal.

15. The non-transitory readable storage medium according to claim 12, wherein the first terminal has to-be-sent data, and the first terminal is further configured to perform clear channel assessment (CCA) on a first resource.

16. The non-transitory readable storage medium according to claim 15, wherein the to-be-sent data is a multicast service, and multicast members comprise the second terminal; or the to-be-sent data is unicast data, and a receive end is the second terminal.

* * * * *